(12) United States Patent
Lee et al.

(10) Patent No.: US 12,534,000 B2
(45) Date of Patent: Jan. 27, 2026

(54) VEHICLE SEAT SLIDING DEVICE

(71) Applicant: DAS CO., LTD, Gyeongju-si (KR)

(72) Inventors: Jong Soon Lee, Ulsan (KR); Jin Gu Park, Ulsan (KR)

(73) Assignee: DAS CO., LTD., Gyeongju-si (KR)

( * ) Notice: Subject to any disclaimer, the term of this patent is extended or adjusted under 35 U.S.C. 154(b) by 394 days.

(21) Appl. No.: 18/153,505

(22) Filed: Jan. 12, 2023

(65) Prior Publication Data

US 2024/0092230 A1    Mar. 21, 2024

(30) Foreign Application Priority Data

Sep. 20, 2022   (KR) .................. 10-2022-0118322

(51) Int. Cl.
 *B60N 2/08*    (2006.01)
(52) U.S. Cl.
 CPC .................. *B60N 2/0831* (2013.01)
(58) Field of Classification Search
 CPC ............................ B60N 2/0831; B60N 2/0875
 USPC ...................................................... 296/65.13
 See application file for complete search history.

(56) References Cited

U.S. PATENT DOCUMENTS

| | | | | |
|---|---|---|---|---|
| 5,234,189 A * | 8/1993 | Myers | ............ | B60N 2/071 |
| | | | | 296/65.13 |
| 6,227,596 B1 * | 5/2001 | Foucault | ............ | B60N 2/123 |
| | | | | 296/65.13 |
| 6,923,415 B2 * | 8/2005 | Yokoi | ............ | B60N 2/0705 |
| | | | | 248/424 |

FOREIGN PATENT DOCUMENTS

| | | |
|---|---|---|
| DE | 69323219 T2 | 6/1999 |
| DE | 102020207409 A1 | 12/2020 |
| JP | 06-048230 A | 2/1994 |
| JP | 2002-264703 A | 9/2002 |
| KR | 102368352 B1 | 2/2022 |

OTHER PUBLICATIONS

Korean Office Action issued in KR patent application No. 10-2022-0118322, dated May 22, 2024, 4 pages.

Office Action issued in connection with German Patent Application No. 10 2023 101 165.0 dated Feb. 17, 2023.

* cited by examiner

*Primary Examiner* — Joseph D. Pape
(74) *Attorney, Agent, or Firm* — Tarolli, Sundheim, Covell & Tummino LLP

(57) ABSTRACT

Disclosed is a vehicle seat sliding device, which prevents noise from being generated when a seat is moved. The vehicle seat sliding device includes: a fixed rail which includes a locking section in which a fixed lock is formed and an unlocking section in which the fixed lock is not formed; a moving rail which slides along the fixed rail; a locking unit which is provided in the moving rail, moves up and down, and has a plurality of locks that is selectively engaged with the fixed lock. When at least one lock of the plurality of locks is located in the unlocking section, remaining locks located in the locking section are disposed apart from the fixed lock so as to have a gap with the fixed lock. With this configuration, when the moving rail is returned from the unlocking section to the locking section, the lock of the locking unit is disposed apart from the fixed lock provided in the fixed rail in such a way as to have a gap, so that noise can be prevented from being generated.

5 Claims, 12 Drawing Sheets

[FIG. 1]
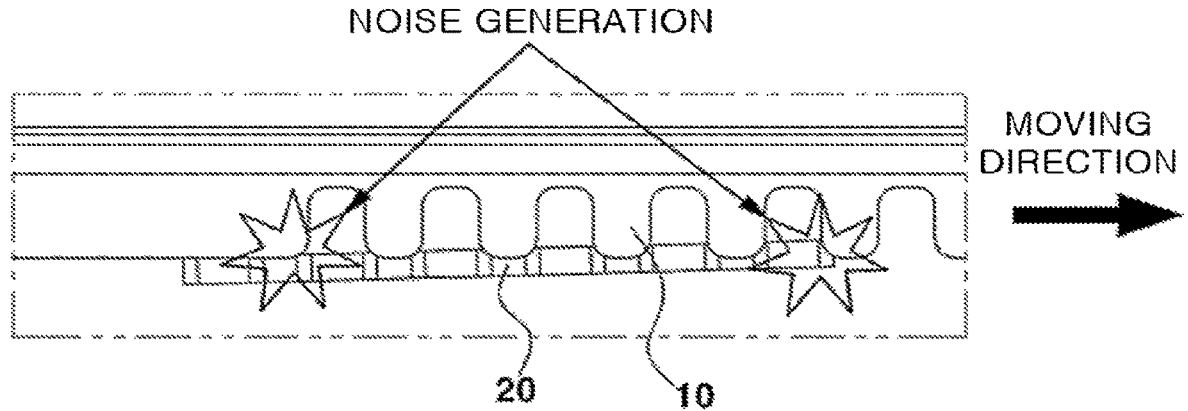

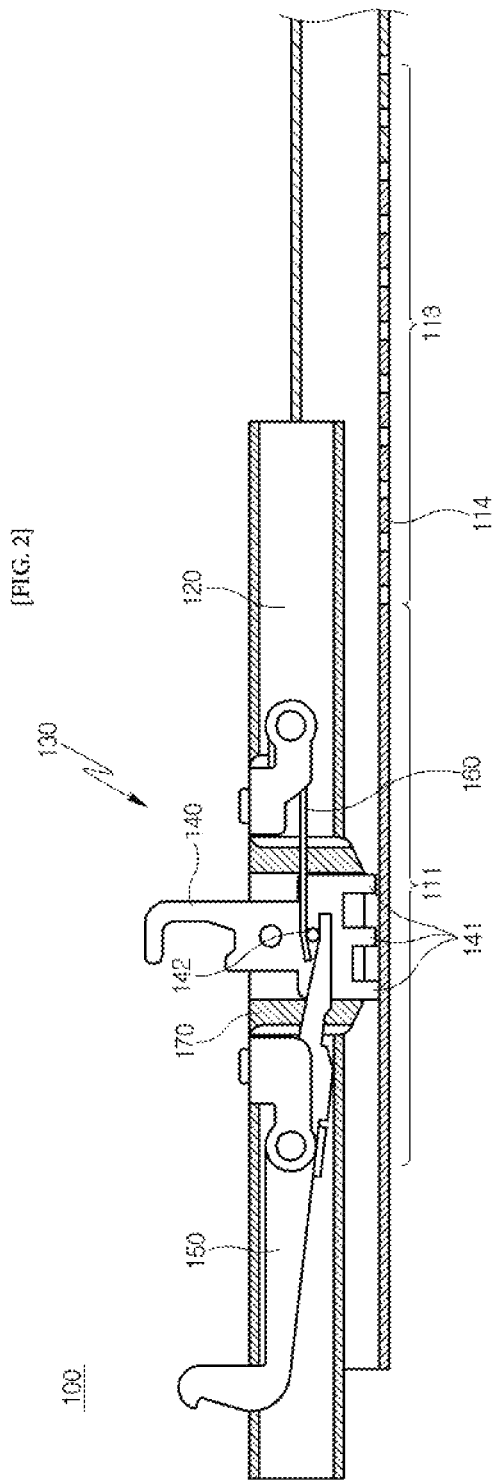

[FIG. 3]
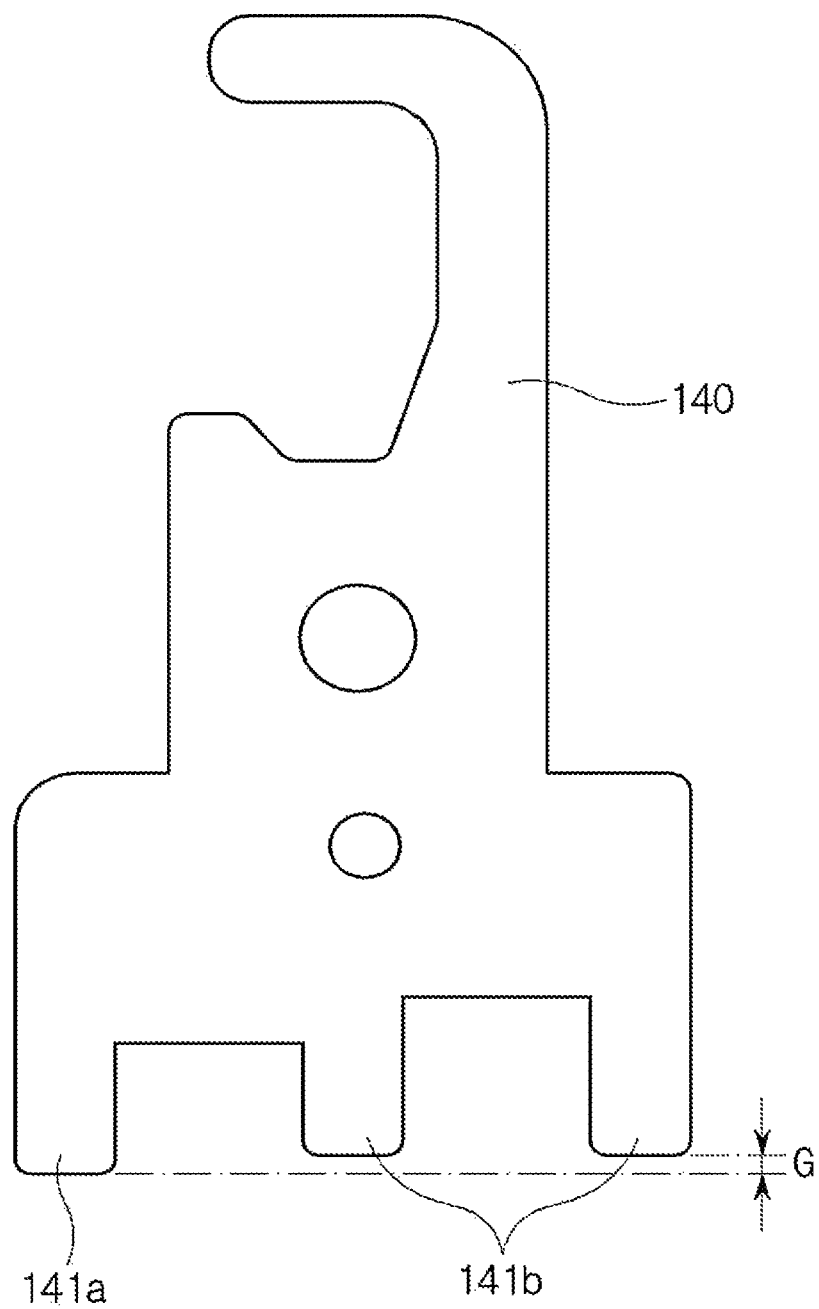

[FIG. 4]
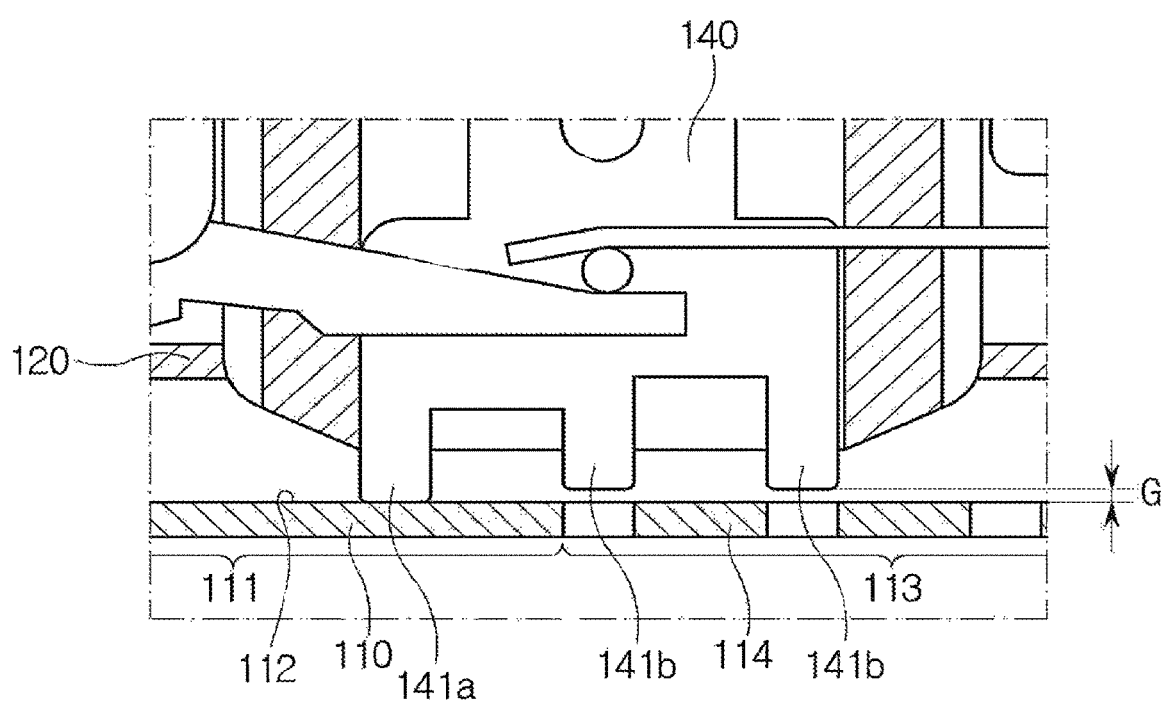

[FIG. 5]
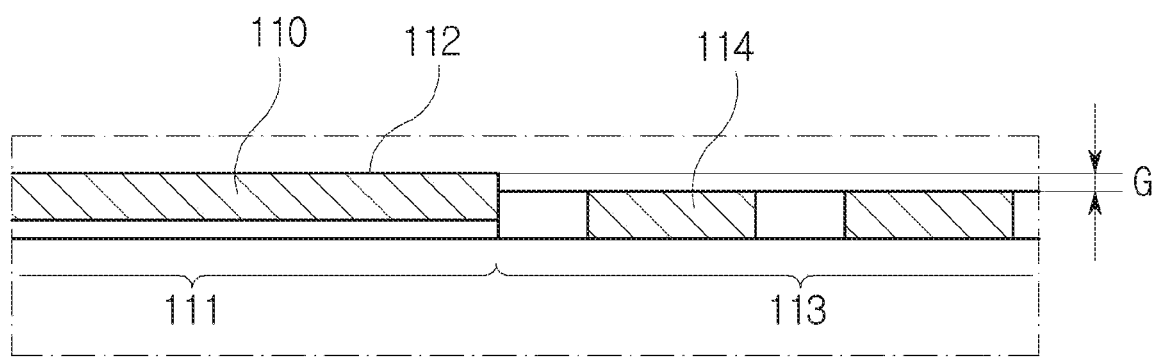

[FIG. 6]
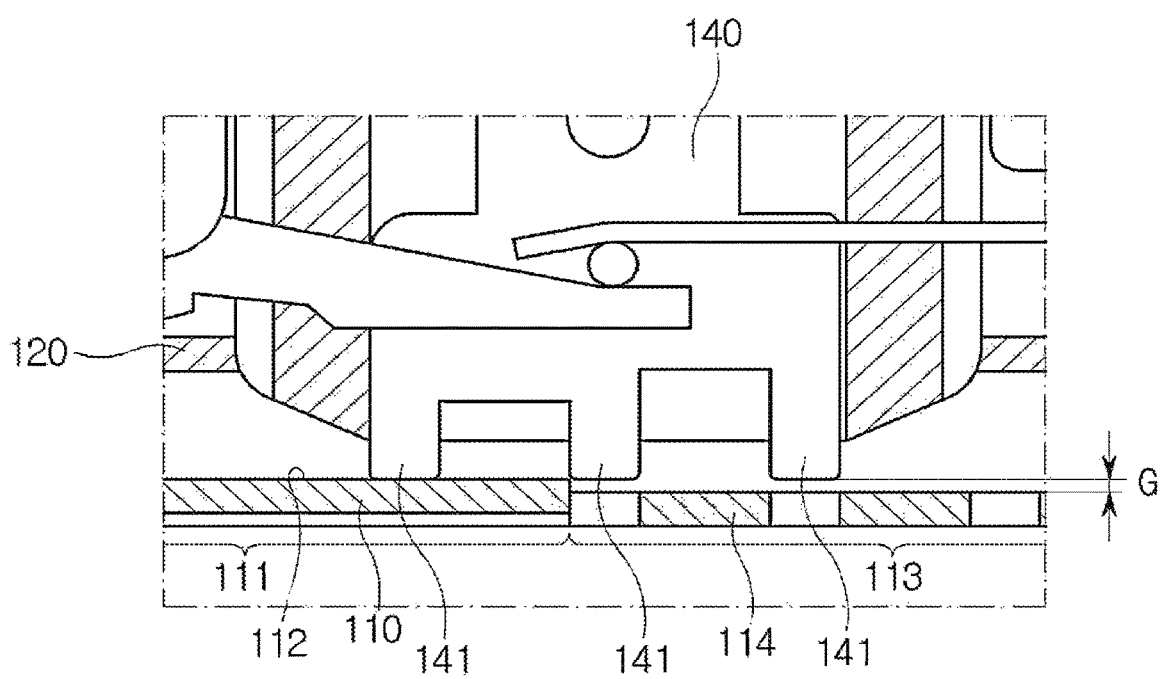

[FIG. 7]
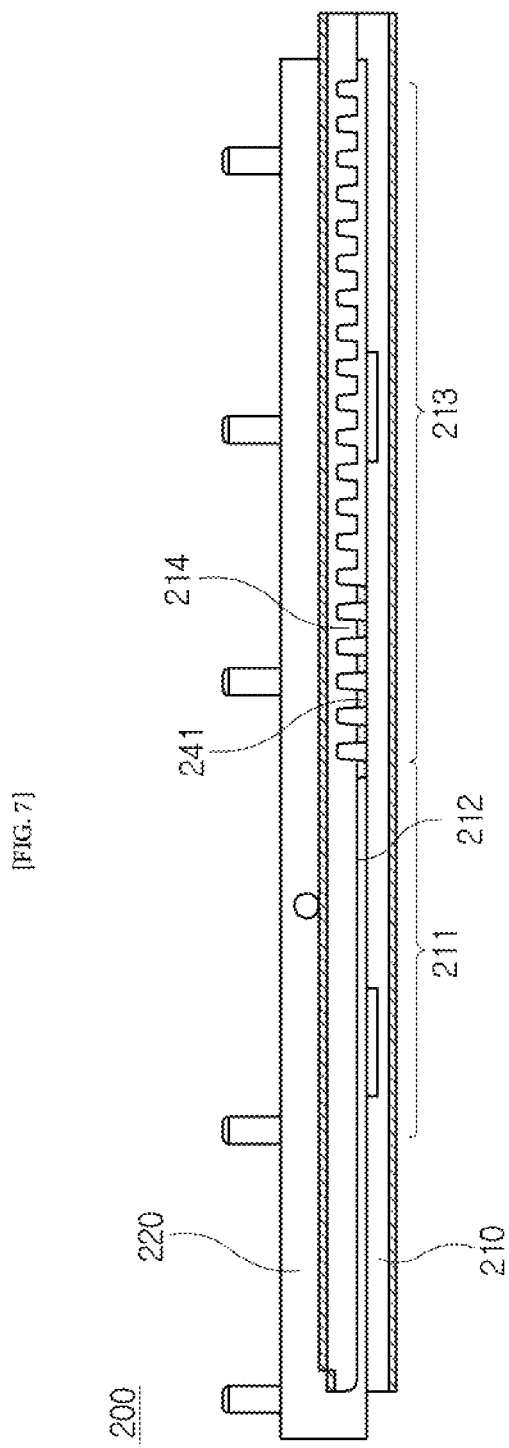

[FIG. 8]
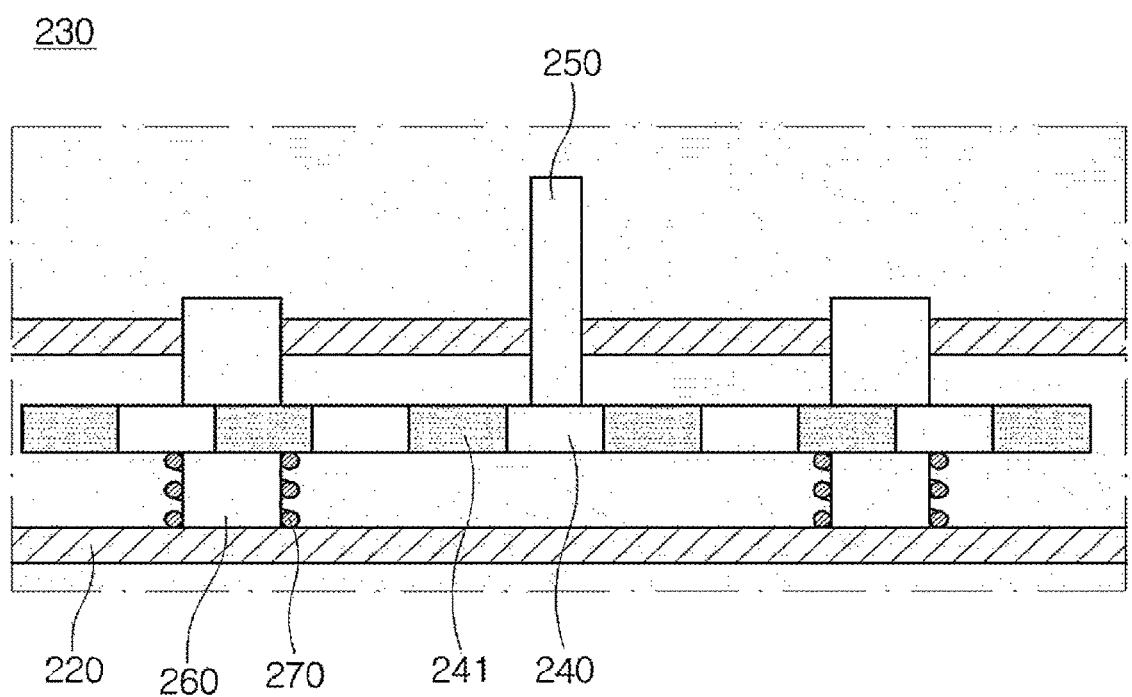

[FIG. 9]
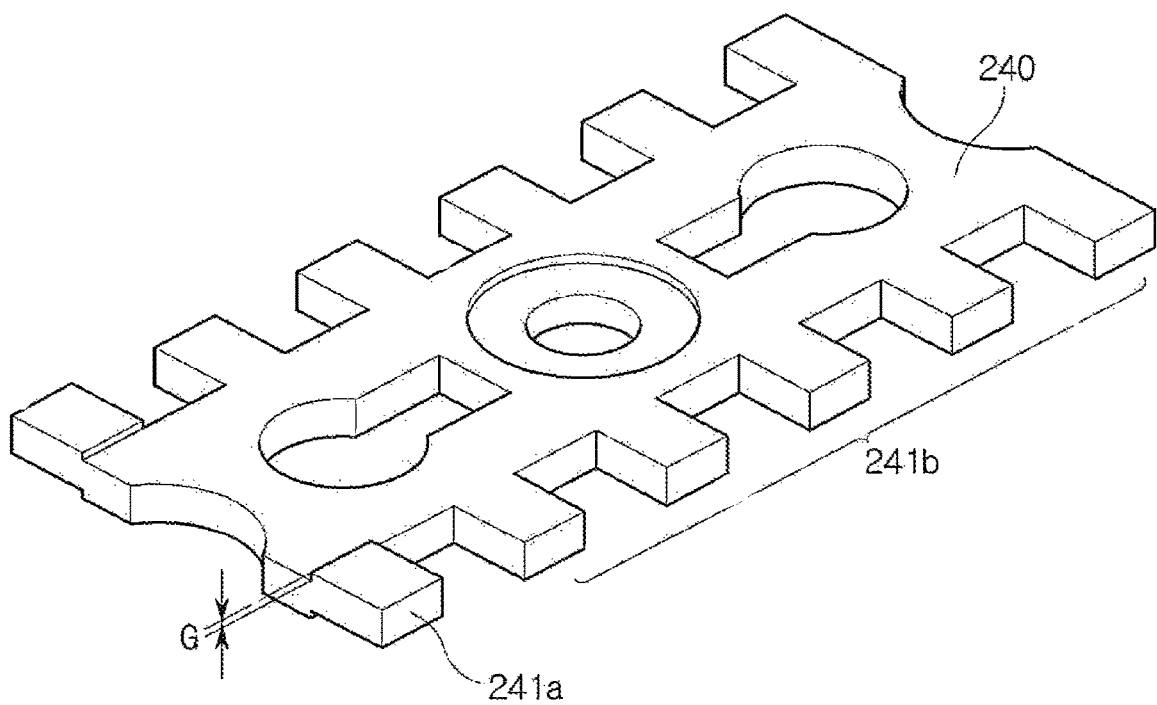

[FIG. 10]
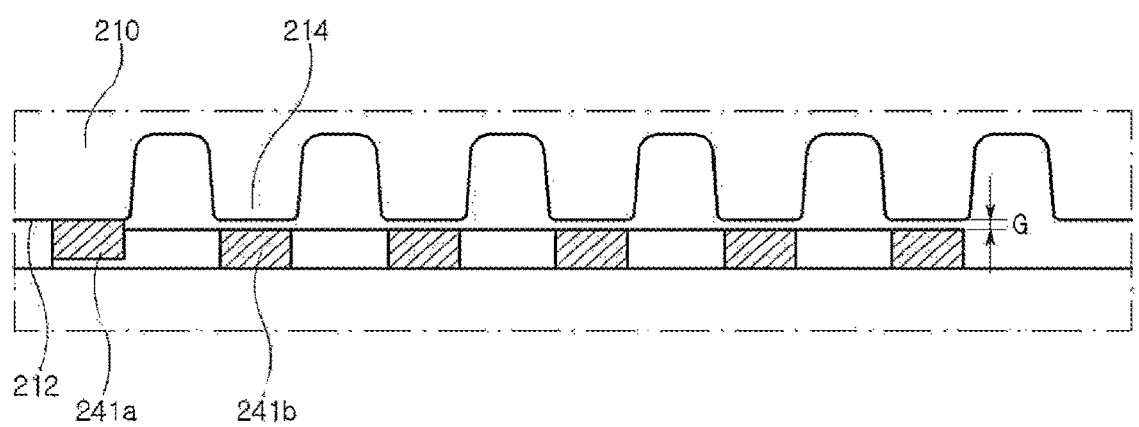

[FIG. 11]
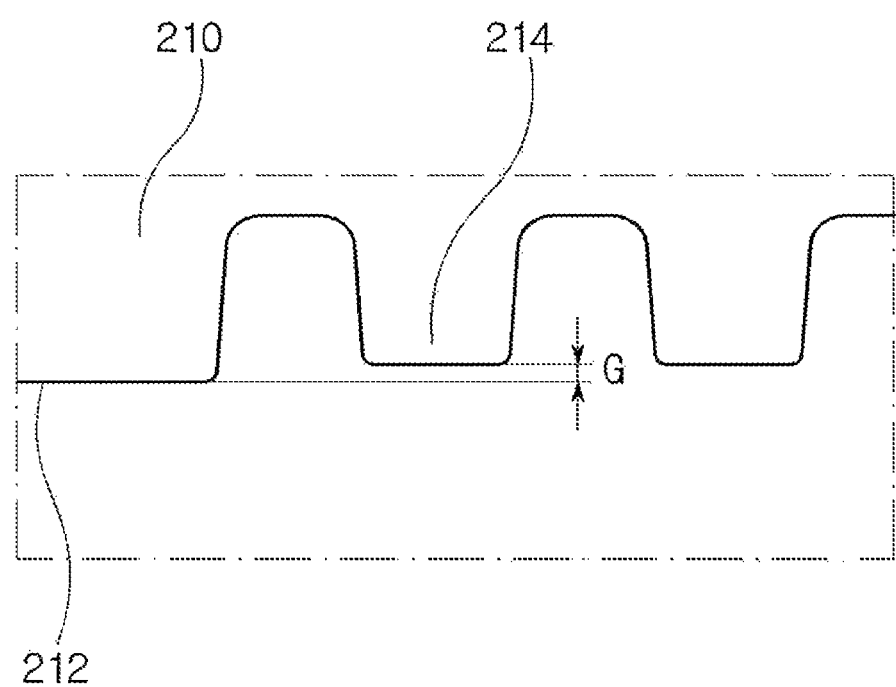

[FIG. 12]
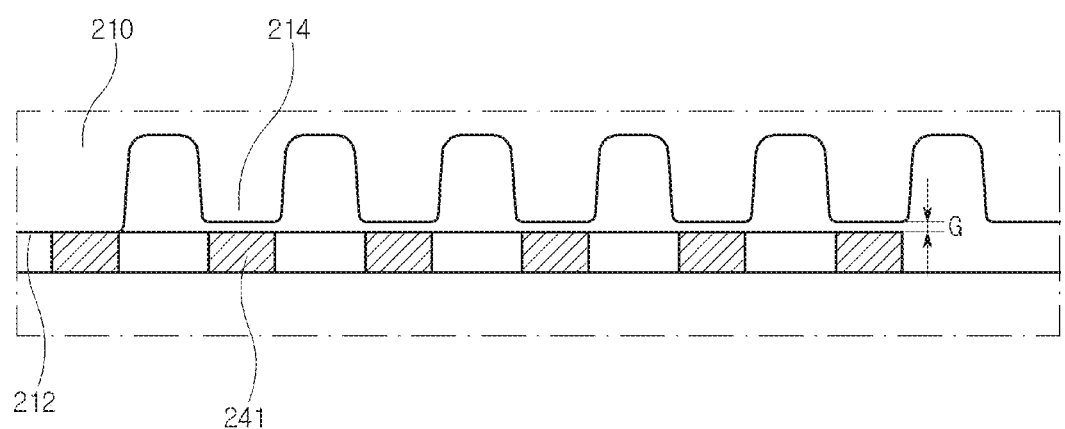

VEHICLE SEAT SLIDING DEVICE

CROSS-REFERENCE TO RELATED APPLICATIONS

The present application claims priority to Korean Patent Application No. 10-2022-0118322, filed Sep. 20, 2022, the entire contents of which is incorporated herein for all purposes by this reference.

BACKGROUND

Field

The present disclosure relates to a vehicle seat sliding device and more particularly to a vehicle seat sliding device, which prevents noise from being generated when a seat is moved.

Description of the Related Art

In general, a vehicle seat is intended to maintain a passenger's riding posture in an optimal state, and includes a seatback supporting the upper body of the passenger and a seat cushion supporting the lower body of the passenger such as the buttocks and thighs.

Also, a seat rail is installed on the vehicle seat in such a manner as to slidably move a certain section in the forward and backward direction of the vehicle body in order to fit the body shape of the passenger.

As shown in FIG. 1, the seat rail includes a fixed rail 10 which is usually fixedly installed on the interior floor of the vehicle in the longitudinal direction of the vehicle body, a moving rail which is provided in the seat and slides along the fixed rail 10, and a locking unit 20 is provided in the moving rail and fixes the seat to a desired position.

That is, when the seat moves in the forward and backward direction, the locking unit 20 is separated from the fixed rail 10, and then the moving rail can slide on the fixed rail 10, so that the seat can be moved to a desired position. Also, after the seat is moved to a desired position, the locking unit 20 is fastened to the fixing rail 10, thereby fixing the seat position.

Also, in order that the passenger is able to easily get in and out of the second or third row of the vehicle, the seat rail may be provided with an unlocking section in which the seat only slides without being locked. In this case, there is a problem that noise is generated due to interference of the locking unit with the fixed rail when the seat is returned from the unlocking section to the locking section after the passenger gets in and out of the vehicle.

SUMMARY

The purpose of the present disclosure is to solve the above problems and is to provide a vehicle seat sliding device capable of preventing noise generation due to interference of the locking unit with the fixed rail when the seat is returned from the unlocking section to the locking section.

One embodiment is a vehicle seat sliding device including: a fixed rail which is provided in the vehicle and includes a locking section in which a fixed lock is formed and an unlocking section in which the fixed lock is not formed; a moving rail which is provided in a seat and slides along the fixed rail; and a locking unit which is provided in the moving rail, moves up and down, and has a plurality of locks that is selectively engaged with the fixed lock.

With this configuration, when at least one lock of the plurality of locks is located in the unlocking section, remaining locks located in the locking section are disposed apart from the fixed lock so as to have a gap with the fixed lock.

For example, the locking unit is moved downward by an elastic force of an elastic member and is locked by that the lock is engaged with the fixed lock in the locking section. When the locking unit is moved upward by an external force, the lock is separated from the fixed lock and is unlocked.

Here, among the plurality of locks of the locking unit, a first lock located in a direction of the unlocking section is formed longer than another lock, so that the remaining locks are disposed apart from the fixed lock so as to have the gap with the fixed lock in the locking section while the first lock is located in the unlocking section.

Also, the fixed rail is formed such that the unlocking section is formed higher than the locking section, and the remaining locks are disposed apart from the fixed lock so as to have the gap with the fixed lock in the locking section while at least one lock is located in the unlocking section.

As another example, the locking unit is moved upward by an elastic force of an elastic member and is locked by that the lock is engaged with the fixed lock in the locking section. When the locking unit is moved downward by an external force, the lock is separated from the fixed lock and is unlocked.

Here, among the plurality of locks of the locking unit, a first lock located in a direction of the unlocking section is formed to protrude more upward than another lock, so that the remaining locks are disposed apart from the fixed lock so as to have the gap with the fixed lock in the locking section while the first lock is located in the unlocking section.

Also, the fixed rail is formed such that the locking section is formed higher than the unlocking section, and the remaining locks are disposed apart from the fixed lock so as to have the gap with the fixed lock in the locking section while at least one lock is located in the unlocking section.

BRIEF DESCRIPTION OF THE DRAWINGS

FIG. 1 is a view schematically showing a state where a locking unit collides with a fixed lock in a conventional vehicle seat sliding device;

FIG. 2 is a view schematically showing a vehicle seat sliding device according to an embodiment of the present disclosure;

FIG. 3 is a view schematically showing a locking plate of the vehicle seat sliding device according to the embodiment of the present disclosure;

FIG. 4 is a view schematically showing a state where a locking unit is located between an unlocking section and a locking section in the vehicle seat sliding device according to the embodiment of the present disclosure;

FIG. 5 is a view schematically showing a portion of a fixed rail in the vehicle seat sliding device according to the embodiment of the present disclosure;

FIG. 6 is a view schematically showing the state where the locking unit is located between the unlocking section and the locking section in the vehicle seat sliding device according to the embodiment of the present disclosure;

FIG. 7 is a view schematically showing a vehicle seat sliding device according to another embodiment of the present disclosure;

FIG. 8 is a view schematically showing a locking unit in the vehicle seat sliding device according to the embodiment of the present disclosure;

FIG. 9 is a view schematically showing a locking plate of the vehicle seat sliding device according to the embodiment of the present disclosure;

FIG. 10 is a view schematically showing a state where the locking unit is located between an unlocking section and a locking section in the vehicle seat sliding device according to the embodiment of the present disclosure;

FIG. 11 is a view schematically showing a portion of a fixed rail in the vehicle seat sliding device according to the embodiment of the present disclosure; and FIG. 12 is a view schematically showing the state where the locking unit is located between the unlocking section and the locking section in the vehicle seat sliding device according to the embodiment of the present disclosure.

DETAILED DESCRIPTION

Hereinafter, preferred embodiment of the present invention will be described in detail with reference to the accompanying drawings.

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

Terms used in the present specification are provided for description of only specific embodiments of the present invention, and not intended to be limiting. An expression of a singular form includes the expression of plural form thereof unless otherwise explicitly mentioned in the context.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Hereinafter, specific embodiments of the present invention will be described with reference to the accompanying drawings.

FIG. 2 is a view schematically showing a vehicle seat sliding device according to an embodiment of the present disclosure. FIG. 3 is a view schematically showing a locking plate of the vehicle seat sliding device. FIG. 4 is a view schematically showing a state where a locking unit is located between an unlocking section and a locking section in the vehicle seat sliding device. FIG. 5 is a view schematically showing a portion of a fixed rail according to another embodiment in the vehicle seat sliding device according to the embodiment of the present disclosure. FIG. 6 is a view schematically showing the state where the locking unit is located between the unlocking section and the locking section in the vehicle seat sliding device.

Referring to FIGS. 2 to 6, the vehicle seat sliding device 100 according to the embodiment of the present disclosure includes a fixed rail 110, a moving rail 120, and a locking unit 130. The fixed rail 110 is provided in the vehicle and includes a locking section 113 and an unlocking section 111. The locking section 113 has a fixed lock 114 formed therein. The fixed lock 114 is not formed in the unlocking section 111. The moving rail 120 is provided in a seat and slides along the fixed rail 110. The locking unit 130 is provided in the moving rail 120, moves up and down, and has a plurality of locks 141 which is selectively engaged with the fixed lock 114.

Here, when at least one lock 141a of the plurality of locks 141 is located in the unlocking section 111, remaining locks 141b located in the locking section 113 are disposed apart from the fixed lock 114 so as to have a gap G with the fixed lock 114.

Through this, in a process in which the moving rail 120 moves from the unlocking section 111 to the locking section 113, it is possible to prevent noise generation due to interference of the lock 141 of the locking unit 130 with the fixed lock 114 of the fixed rail 110.

The locking unit 130 of the vehicle seat sliding device 100 according to the embodiment of the present disclosure is moved downward by an elastic force of an elastic member 160 and is locked by that the lock 141 is engaged with the fixed lock 114 in the locking section 113. When the locking unit 130 is moved upward by an external force, the lock 141 may be separated from the fixed lock 114 and be unlocked.

For example, referring to FIG. 2, the locking unit 130 may include a guide bracket 170, a locking plate 140, a locking lever 150, and the elastic member 160. The guide bracket 170 is provided in the moving rail 120. The locking plate 140 is inserted into the guide bracket 170 to slide in the up and down direction, and is equipped with the plurality of locks 141. The locking lever 150 is provided to be rotated in the moving rail 120, has one side end protruding outward from the moving rail 120, and has the other side end supporting a lower portion of a support protrusion 142 provided in the locking plate 140. The elastic member 160 has one side end which is supported by the moving rail 120 and the other side end which supports an upper portion of the support protrusion 142 and applies an elastic force to move the locking plate 140 downward.

With this configuration, when the locking unit 130 is located in the locking section 113, the locking plate 140 moves downward by the elastic force of the elastic member 160, and then the lock 141 is engaged with the fixed lock 114 provided in the fixed rail 110 and locked, so that the moving rail 120 is fixed in position.

Further, when one side end of the locking lever 150 is pressed, the other side end of the locking lever 150 moves the locking plate 140 upward as the locking lever 150 rotates, so that the lock 141 is separated from the locking plate 140 and the locking is released. Accordingly, the moving rail 120 can be moved in the forward and backward direction along the fixed rail 110.

In the locking unit 130, when at least one lock 141a of the plurality of locks 141 is located in the unlocking section 111, the remaining locks 141b located in the locking section 113 may be provided according to two embodiments in such a way as to be disposed apart from the fixed lock 114 so as to have the gap G with the fixed lock 114.

As a first embodiment, referring to FIG. 3, among the plurality of locks 141 formed on the locking plate 140 of the locking unit 130, the first lock 141a located in the direction of the unlocking section 111 is formed longer than another lock 141b.

With this configuration, referring to FIG. 4, while the first lock 141a is located in the unlocking section 111, the remaining locks 141b are disposed apart from the fixed lock 114 so as to have the gap G with the fixed lock 114 in the locking section 113.

Therefore, in the process in which the moving rail 120 moves from the unlocking section 111 to the locking section 113, it is possible to prevent noise generation due to interference of the lock 141 with the fixed lock 114.

As a second embodiment, referring to FIG. 5, the fixed rail 110 may be formed such that the unlocking section 111 is formed higher than the locking section 113. That is, a guide surface 112 on which the lock 141 moves while contacting with, in the unlocking section 111, is formed higher than the fixed lock 114 of the locking section 113, and the gap G is formed.

With this configuration, referring to FIG. 6, while at least one lock 141 is located in the unlocking section 111, that is, while in contact with the guide surface 112, the remaining locks 141 are disposed apart from the fixed lock 114 so as to have the gap G with the fixed lock 114 in the locking section 113.

Therefore, in the process in which the moving rail 120 moves from the unlocking section 111 to the locking section 113, it is possible to prevent noise generation due to interference of the lock 141 with the fixed lock 114.

Hereinafter, a vehicle seat sliding device according to another embodiment of the present disclosure will be described with reference to the drawings. From the viewpoint of the locking unit, the vehicle seat sliding device according to another embodiment of the present disclosure is different from the vehicle seat sliding device according to the embodiment of the present disclosure.

FIG. 7 is a view schematically showing a vehicle seat sliding device according to another embodiment of the present disclosure. FIG. 8 is a view schematically showing a locking unit in the vehicle seat sliding device. FIG. 9 is a view schematically showing a locking plate of the vehicle seat sliding device. FIG. 10 is a view schematically showing a state where the locking unit is located between an unlocking section and a locking section in the vehicle seat sliding device. FIG. 11 is a view schematically showing a portion of a fixed rail in the vehicle seat sliding device according to the above-described another embodiment. FIG. 12 is a view schematically showing the state where the locking unit is located between the unlocking section and the locking section in the vehicle seat sliding device.

Referring to FIGS. 7 to 12, the vehicle seat sliding device 200 according to the embodiment of the present disclosure includes a fixed rail 210, a moving rail 220, and a locking unit 230. The fixed rail 210 includes a locking section 213 and an unlocking section 211. The locking section 213 is provided in the vehicle and has a fixed lock 214 formed therein. The fixed lock 214 is not formed in the unlocking section 211. The moving rail 220 is provided in a seat and slides along the fixed rail 210. The locking unit 230 is provided in the moving rail 220, moves up and down, and has a plurality of locks 241 which is selectively engaged with the fixed lock 214.

Here, when at least one lock 241a of the plurality of locks 241 is located in the unlocking section 211, remaining locks 241b located in the locking section 213 are disposed apart from the fixed lock 214 so as to have a gap G with the fixed lock 214.

Through this, in a process in which the moving rail 220 moves from the unlocking section 211 to the locking section 213, it is possible to prevent noise generation due to interference of the lock 241 of the locking unit 230 with the fixed lock 214 of the fixed rail 210.

The locking unit 230 of the vehicle seat sliding device 200 according to the embodiment of the present disclosure is moved upward by an elastic force of an elastic member 270 and is locked by that the lock 241 is engaged with the fixed lock 214 in the locking section 213. When the locking unit 230 is moved downward by an external force, the lock 241 may be separated from the fixed lock 214 and be unlocked.

For example, referring to FIG. 8, the locking unit 230 may include a guide portion 260, a locking plate 240, a pressing rod 250, the elastic member 270. The guide portion 260 is provided in the moving rail 220. The locking plate 240 is inserted into the guide portion 260 to slide in the up and down direction, and is equipped with the plurality of locks 241 on both sides thereof. The pressing rod 250 has one side end protruding outward from the moving rail 220 and the other side end fastened to the locking plate 240. The elastic member 270 is inserted into the guide portion 260, is disposed between the movable rail 220 and the locking plate 240, and applies an elastic force to move the locking plate 240 upward.

With this configuration, when the locking unit 230 is located in the locking section 213, the locking plate 240 moves upward by the elastic force of the elastic member 270, so that the lock 241 is engaged with the fixed lock 214 provided in the fixed rail 210 and locked, and the moving rail 220 is fixed in position.

Further, when the pressing rod 250 is pressed, the locking plate 240 moves downward, so that the lock 241 is separated from the fixed lock 214 and the locking is released. Accordingly, the moving rail 220 can be moved in the forward and backward direction along the fixed rail 210.

In the locking unit 230, when at least one lock 241a of the plurality of locks 241 is located in the unlocking section 211, the remaining locks 241b located in the locking section 213 may be provided according to two embodiments in such a way as to be disposed apart from the fixed lock 114 so as to have the gap G with the fixed lock 114.

As a first embodiment, referring to FIG. 9, among the plurality of locks 241 formed on the locking plate 240 of the locking unit 230, the first lock 241a located in the direction of the unlocking section 211 is formed to protrude more upward than another lock 241b.

With this configuration, referring to FIG. 10, while the first lock 241a is located in the unlocking section 211, the remaining locks 241b are disposed apart from the fixed lock 214 so as to have the gap G with the fixed lock 214 in the locking section 213.

Therefore, in the process in which the moving rail 220 moves from the unlocking section 211 to the locking section 213, it is possible to prevent noise generation due to interference of the lock 241 with the fixed lock 214.

As a second embodiment, referring to FIG. 11, the fixed rail 210 may be formed such that the locking section 213 is formed higher than the unlocking section 211. That is, a guide surface 212 on which the lock 241 moves while contacting with, in the unlocking section 211, is located below the fixed lock 214 of the locking section 213, and the gap G is formed.

With this configuration, referring to FIG. 12, while at least one lock 241 is located in the unlocking section 211, that is, while in contact with the guide surface 212, the remaining locks 241 are disposed apart from the fixed lock 214 so as to have the gap G with the fixed lock 214 in the locking section 213.

Therefore, in the process in which the moving rail 220 moves from the unlocking section 211 to the locking section 213, it is possible to prevent noise generation due to interference of the lock 241 with the fixed lock 214.

Although the present invention has been described above by way of the specific embodiments, this is for describing the present invention in detail. The present invention is not limited thereto and it is clear that the present invention can be modified or improved within the spirit of the present invention by those of ordinary skill in the art.

All simple modifications or changes of the present invention fall within the scope of the present invention. The specific scope of protection of the present invention will be apparent by the appended claims.

Advantageous Effects

According to the vehicle seat sliding device of the present disclosure, when the moving rail provided in the seat is returned from the unlocking section to the locking section, the lock of the locking unit is disposed apart from the fixed lock provided in the fixed rail in such a way as to have a gap, so that noise can be prevented from being generated.

REFERENCE NUMERALS 100, 200: Vehicle Seat Sliding Device
110, 210: Fixed Rail
111, 211: Unlocking Section
112, 212: Guide Surface
113, 213: Locking Section
114, 214: Fixed Lock
120, 220: Moving Rail
130, 230: Locking Unit
140, 240: Locking Plate
141, 241: Lock

What is claimed is:

1. A vehicle seat sliding device comprising:
a fixed rail which is provided in the vehicle and comprises a locking section in which a fixed lock is formed and an unlocking section in which the fixed lock is not formed;
a moving rail which is provided in a seat and slides along the fixed rail; and
a locking unit which is provided in the moving rail, moves up and down, and has a plurality of locks that is selectively engaged with the fixed lock,
wherein, when at least one lock of the plurality of locks is located in the unlocking section, remaining locks located in the locking section are disposed apart from the fixed lock so as to have a gap with the fixed lock; and
wherein the locking unit is moved downward by an elastic force of an elastic member and is locked by that a lock is engaged with the fixed lock in the locking section, and wherein, when the locking unit is moved upward by an external force, the lock is separated from the fixed lock and is unlocked, or wherein the locking unit is moved upward by an elastic force of an elastic member and is locked by that the lock is engaged with the fixed lock in the locking section, and wherein, when the locking unit is moved downward by the external force, the lock is separated from the fixed lock and is unlocked.

2. The vehicle seat sliding device of claim 1, wherein when the locking unit is moved upward by the external force, the lock is separated from the fixed lock and is unlocked, and wherein, among the plurality of locks of the locking unit, a first lock located in a direction of the unlocking section is formed longer than another lock, so that the remaining locks are disposed apart from the fixed lock so as to have the gap with the fixed lock in the locking section while the first lock is located in the unlocking section.

3. The vehicle seat sliding device of claim 1, wherein the fixed rail is formed such that the unlocking section is formed higher than the locking section, and remaining locks are disposed apart from the fixed lock so as to have the gap with the fixed lock in the locking section while at least one lock is located in the unlocking section.

4. The vehicle seat sliding device of claim 1, wherein when the locking unit is moved downward by the external force, the lock is separated from the fixed lock and is unlocked, and wherein, among the plurality of locks of the locking unit, a first lock located in a direction of the unlocking section is formed to protrude more upward than another lock, so that the remaining locks are disposed apart from the fixed lock so as to have the gap with the fixed lock in the locking section while the first lock is located in the unlocking section.

5. The vehicle seat sliding device of claim 1, wherein when the locking unit is moved downward by the external force, the lock is separated from the fixed lock and is unlocked, and wherein the fixed rail is formed such that the locking section is formed higher than the unlocking section, and the remaining locks are disposed apart from the fixed lock so as to have the gap with the fixed lock in the locking section while at least one lock is located in the unlocking section.

* * * * *